United States Patent [19]

Mahoff

[11] 3,999,745

[45] Dec. 28, 1976

[54] SNUBBER
[75] Inventor: George A. Mahoff, Buena Park, Calif.
[73] Assignee: Hydraflow Supply, Inc., Los Angeles, Calif.
[22] Filed: Oct. 24, 1975
[21] Appl. No.: 625,508
[52] U.S. Cl. .............................. 267/64 R; 267/129; 188/322; 213/43
[51] Int. Cl.² ......................................... F16F 5/00
[58] Field of Search .............. 267/64 R, 65 R, 129; 188/322; 308/3.5; 213/43; 105/197 B; 277/121, 135, 117, 118

[56] References Cited
UNITED STATES PATENTS

| 1,755,436 | 4/1930 | Faudi | 267/65 |
| 2,020,122 | 11/1935 | Padgett | 267/64 R |
| 3,592,164 | 7/1971 | Schultze | 188/322 |
| 3,682,461 | 8/1972 | Wachenheim | 213/43 |

FOREIGN PATENTS OR APPLICATIONS 1,133,639   7/1962   Germany .................... 267/64 R Primary Examiner—James B. Marbet

[57] ABSTRACT

A snubber having a seal assembly in which a seal having a generally U-shaped cross section encircling a reciprocating rod is engaged with a separate integral wedge element in such a way that radial loads are applied so as to force the outer lip of the seal outwardly and the inner lip of the seal inwardly. The outwardly directed radial load is uniform around the entire seal, and the inwardly directed radial load is likewise uniform around the entire seal; however, the inwardly directed radial load is greater than the outwardly directed radial load.

4 Claims, 6 Drawing Figures

U.S. Patent  Dec. 28, 1976  Sheet 1 of 2  3,999,745
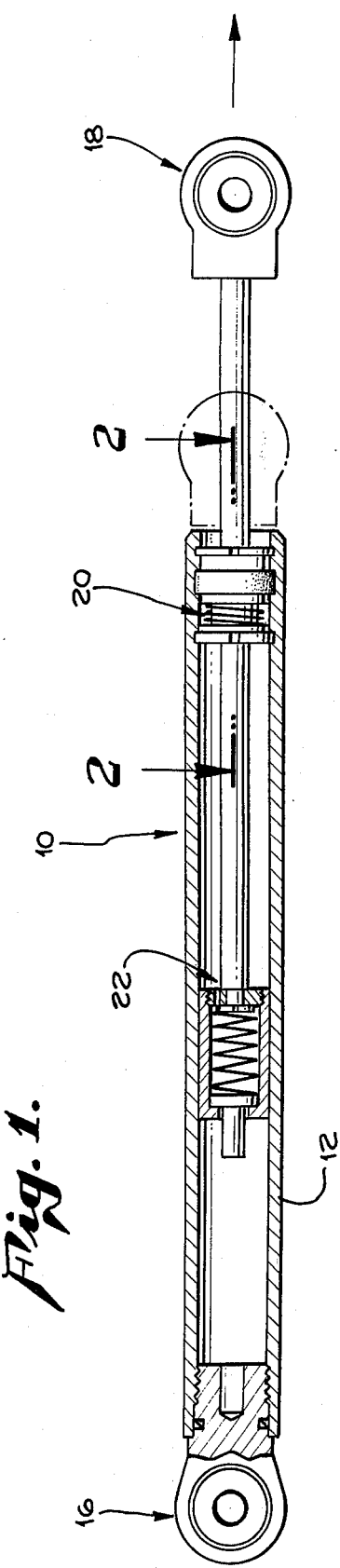
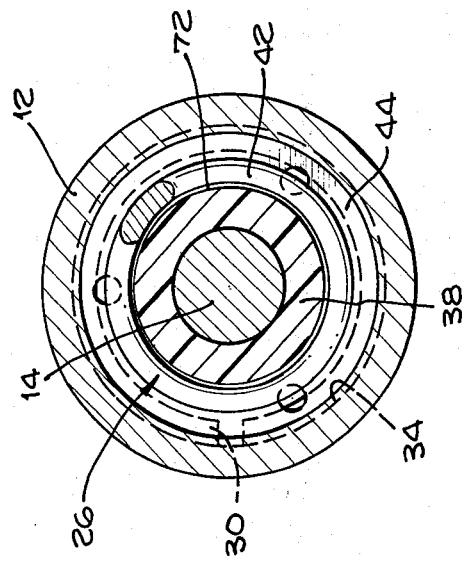
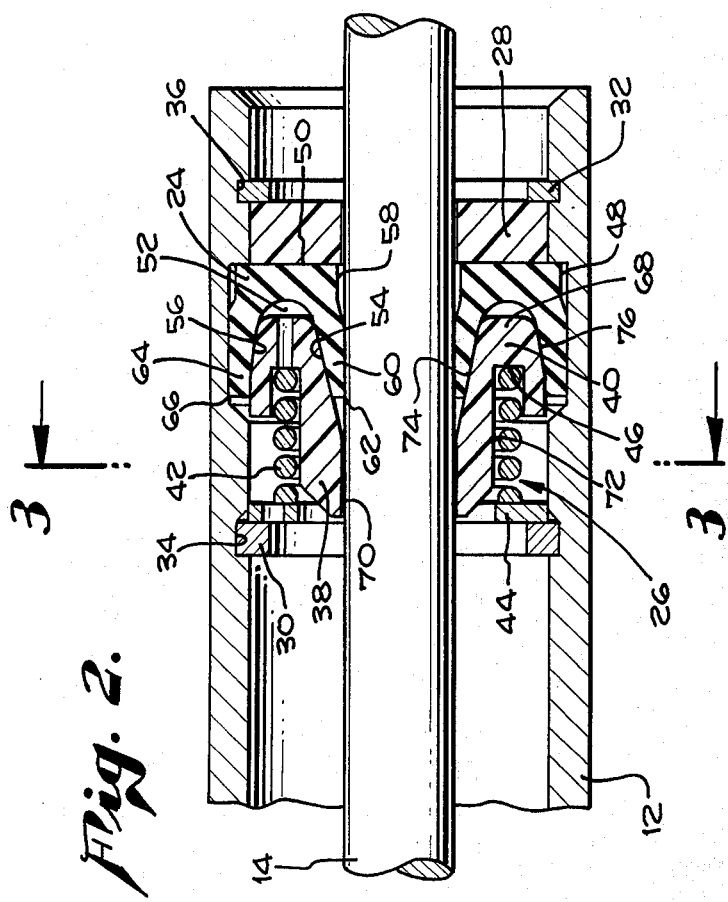

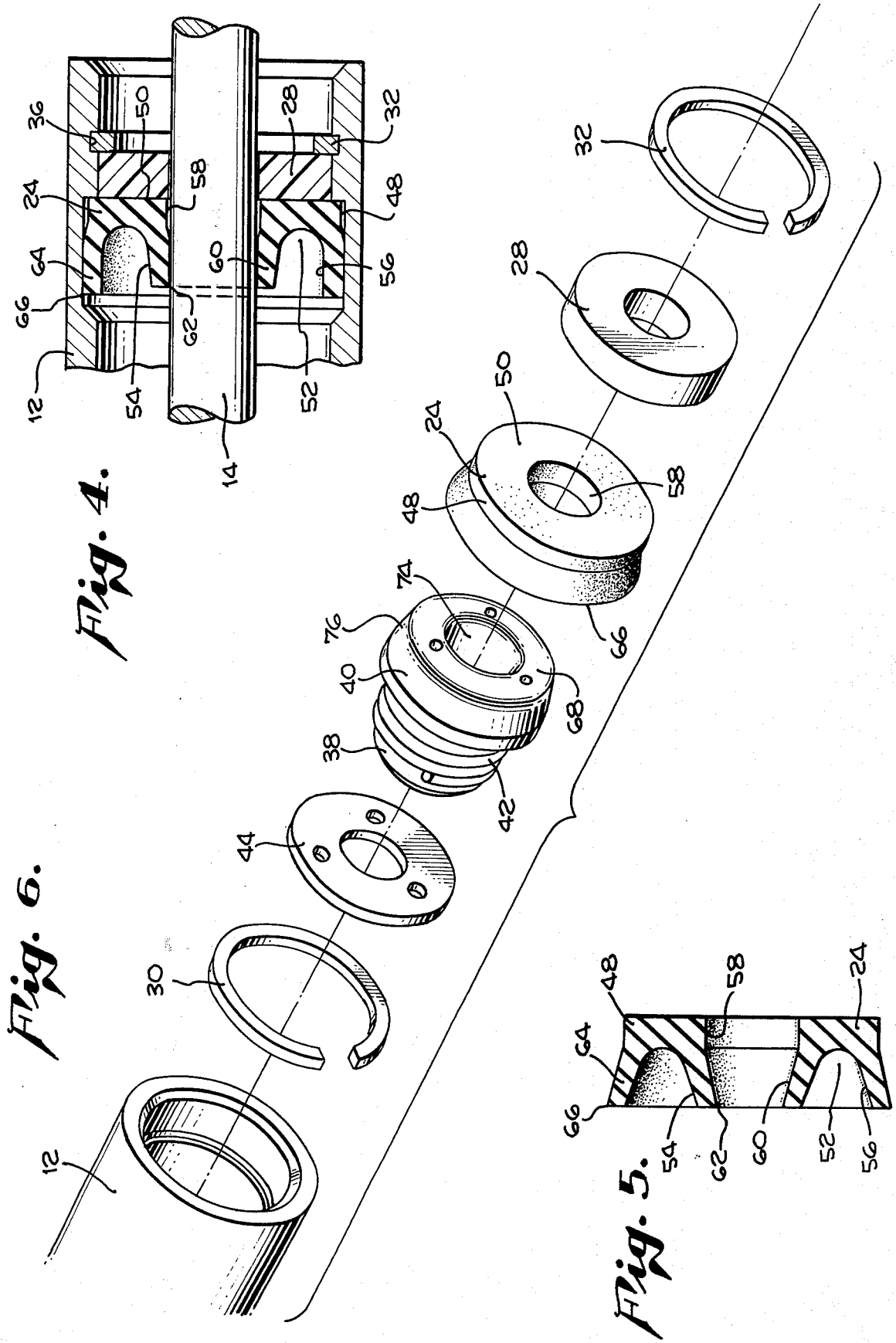

SNUBBER

The present invention relates to a seal assembly for sealing a snubber unit and to the snubber unit which is so sealed.

Snubbers are often used inside of the passenger compartments of aircraft. Safety regulations dictate that the fluid used in these snubber units be nonflammable and nontoxic. The fluid which is most commonly used in such snubber units is a silicone fluid, such as, for example, dimethyl polysiloxane. Silicone fluids having a viscosity of approximately 1000 centistokes are generally used. This material has a very low surface tension which makes it very difficult to seal. The snubber is often used in such structures as overhead luggage racks and adjustable seat backs to prevent the abrupt movement of these structures which might result in personal injuries. The use of a snubber, for example, on an overhead storage bin door in an aircraft passenger compartment insures that the bin door will open at a controlled rate and will not unexpectedly drop on a passenger's head. Because of the aircraft environment in which they are used, these snubber devices must be small, compact, efficient, lightweight, simple, and reliable. They must also be capable of operating under different conditions of usage. A snubber may receive considerable usage every day for a period of some months and may then stand unmoved for several months before it is again placed in daily operation. The snubber must not leak under static or dynamic conditions throughout the entire life of the device.

In addition to a wide range of loads that a snubber encounters under normal operating conditions, it must also remain functional when subjected to high overloads. For example, when the aircraft hits turbulent air while a passenger is standing up in the process of opening the luggage bin door, the passenger will hang onto the bin door as the only available means of support. Thus, a force equal to several times the passenger's weight has to be absorbed by the snubber.

Previously, considerable difficulty had been encountered in sealing snubber devices in which silicone fluid was used. Leakage of snubber devices in passenger compartments of aircraft resulted in irreversibly staining clothing, luggage, and other personal articles. Previous devices tended to leak particularly under static conditions where there was no hydraulic pressure within the snubber. Also, previous seal assemblies tended to accumulate silicone fluid on the surface of the moving element of the snubber so that a small amount of silicone fluid was transmitted through the seal with each cycle of the snubber. Some of the fluid, which was thusly transmitted through the seal, was wiped off the moving member on the next cycle so that after a number of cycles there was an accumulation of silicone fluid on the open side of the seal. This silicone fluid tended to flow onto adjacent objects, thus staining those objects.

These and other difficulties of the prior art have been overcome according to the present invention wherein a seal assembly is provided in which a simple, efficient, compact, lightweight, and reliable seal assembly effectively provides for the sealing of a snubber in both active and inactive operating conditions.

A seal assembly is provided in which an annular elastomeric seal is positioned within the cylindrical bore of a hydraulic cylinder. The seal has radially inner and outer sealing lips which are arranged in a generally U-shaped cross-sectional configuration. The seal is positioned in the bore of the hydraulic cylinder so that the U-shaped cross-sectional configuration opens axially towards the fluid-sealed side of the seal. The outermost edge of the radially outer sealing lip is continually urged by an outwardly directed radial load into sealing contact with an inner wall of the hydraulic cylinder. This sealing contact is accomplished between stationary elements. The outwardly directed radial load is applied in such a way that it is distributed uniformly around the entire circumference of the lip. Thus, there are no areas in which the fluid can seep past the stationary side of the seal. On the dynamic side of the seal, the inner lip is forced radially inwardly against the cylindrical surface of a shaft which is axially movable relative to the hydraulic cylinder. The load which is directed radially inwardly against the inner lip forces the outermost edge of that lip into sealing engagement with the slidable shaft. The inwardly directed radial load is applied uniformly around the circumference of the inner lip. The concentration of the radial force in the area of the outermost edge of the inner sealing lip assures that the lip will wipe the shaft clean as it reciprocates past the seal. In order to insure that the dynamic side of the seal is effective, the radial load which is applied inwardly against the inner sealing lip is greater than the radial load which is applied against the outer sealing lip.

The radial loads are applied to the seal through the action of a separate annular integral wedging element which projects in wedging relationship between the sealing lips. The wedging element is urged into contact with the seal by a helical compression spring. The spring and the wedging element are held in alignment by a guide which is an integral part of the annular wedging element. The guide portion of the wedging element cooperates with the shaft to maintain the wedging element in a position which is both concentric with the shaft and parallel with a plane which is normal to the longitudinal axis of the shaft. Maintaining the annular wedging element in the proper concentric and angular relationship relative to the shaft insures that the radial loads applied to the respective sealing lips will be distributed uniformly around each individual sealing lip.

The present invention provides a seal assembly in which a single, integral, annular wedging element applies radial loads to the inner and outer lips of a seal in such a way that the loads applied to the respective sealing lips are applied uniformly around the circumferences of the individual lips, but as between the two lips the loads are proportioned so that the inner lip on the dynamic side of the seal receives a greater load than the outer lip on the stationary side of the seal.

In the specific embodiment which is depicted in the drawings for purposes of illustration and not limitation:

FIG. 1 is a partial sectional view of a snubber which incorporates a seal assembly according to the present invention;

FIG. 2 is a sectional view taken along line 2—2 of FIG. 1;

FIG. 3 is a sectional view taken along line 3—3 of FIG. 2;

FIG. 4 is a fragmentary cross-sectional view similar to FIG. 2;

FIG. 5 is a cross-sectional view showing the unrestrained seal alone; and

FIG. 6 is an exploded perspective view of the seal assembly in its operating environment.

Referring particularly to FIG. 1, there is a snubber indicated generally at 10 which includes a cylinder adapted to contain an hydraulic fluid and to receive axially for axial movement a cylindrical rod 14. Cylinder 12 is provided with an eye 16 which is adapted for attachment to an adjacent structure. Rod 14 is provided with an eye 18 which is likewise adapted for attachment to an adjacent structure. The cylinder 12 is adapted to contain an hydraulic fluid. The hydraulic fluid is retained within the cylinder 12 by means of seal assembly 20. A variable orifice valve 22 is attached to and moves with rod 14. This valve produces a snubbing (retarding) force by restricting the flow of fluid through its orifice. The size of the orifice varies in an inverse proportion to the load applied, maintaining thereby a relatively constant time cycle for a wide range of applied loads.

Seal assembly 20 includes an annular elastomeric seal 24, a seal actuator mechanism 26, rod bearing 28, and snap rings 30 and 32. Snap rings 30 and 32 are received in grooves 34 and 36, respectively, in an inner wall of cylinder 12 so as to retain the seal assembly 20 in a stationary position relative to cylinder 12. Seal actuator mechanism 26 includes a cylindrical guide portion 38, an annular integral wedge portion 40, a helical compression spring 42, and spring retainer 44. An annular groove 46 is defined in the annular integral wedge portion 40 so as to receive helical compression spring 42.

Annular elastomeric seal 24 has an outer circumferential wall 48, a base 50, and a circular recess 52 which opens axially towards the fluid side of seal 24 so as to define sealing lips which are arranged in a generally U-shaped cross section. The walls 54 and 56 of the circular recess have a generally frustoconical configuration in which the walls diverge outwardly towards the fluid side of seal 24. The circular recess 52 together with inner circumferential wall 58 defines the radially inner sealing lip 60. Radially inner sealing lip 60 is adapted to contact the cylindrical exterior surface of rod 14 over most of the length of inner circumferential wall 58; however, the outermost edge 62 bears most forcibly on rod 14 so as to accomplish a wiping action. Radially outer sealing lip 64 is defined by wall 56 and outer circumferential wall 48. The outermost edge 66 of outer sealing lip 64 is urged forcibly against the wall of cylinder 12 to provide a static seal at this location.

In its unrestrained configuration the lips of elastomeric seal 24 spread apart somewhat so that the diameter of inner sealing lip 60 is smaller than in its restrained configuration, and the diameter of outer sealing lip 64 is greater than it is in its restrained configuration. When placed in the restrained sealing configuration, the radially inner sealing lip 60 is stretched and thus somewhat shortened, and outer sealing lip 64 is compressed so that it is somewhat lengthened. This is apparent, for example, in FIGS. 2, 4, and 5. Seal 24 is constructed so that outer circumferential wall 48, walls 54 and 56, and the inner circumferential wall 58 are all concentric with the longitudinal axis of cylindrical rod 14.

Seal actuator mechanism 26 is positioned on the fluid side of seal 24. Cylindrical guide portion 38 serves to align and stabilize annular integral wedge portion 40 so that wedge portion 40 moves axially and concentrically with the longitudinal axis of rod 14. Also, cylindrical rod portion 38 maintains wedge portion 40 in angular relation to the longitudinal axis of rod 14 so that the plane defined by the outermost tip of annular nose 68 extends normal to the longitudinal axis of rod 14. The inner cylindrical wall 70 of cylindrical guide portion 38 is of such a diameter that it receives circular rod 14 in a snug sliding fit. Outer cylindrical wall 72 of cylindrical guide portion 38 is concentric with inner cylindrical wall 70 and is of such a diameter that helical compression spring 42 just slides freely over it. Wedge portion 40 includes converging walls 74 and 76 which are arranged in a generally frusto-conical configuration. Walls 74 and 76 converge outwardly toward circular recess 52. Converging walls 74 and 76 terminate in annular nose 68 which has a generally bullet-shaped cross section. The converging walls 74 and 76 are concentric with the longitudinal axis of rod 14. The converging walls 74 and 76 converge at an included angle which is greater than the included angle between diverging walls 54 and 56 of circular recess 52. At the location where they are closest together, converging walls 74 and 76 define a structure which is narrower than the distance between walls 54 and 56 at the outermost part of circular recess 52. At the base of annular inner wedge portion 40 where converging walls 74 and 76 are furthest apart, the wedge portion 40 is thicker than the distance between walls 54 and 56 at the top of the U-shaped recess so that as integral wedge portion 40 advances into circular recess 52 converging walls 74 and 76 contact diverging walls 54 and 56 at the top of the U-shaped circular recess 52 so as to force the outermost edges 62 and 66 into contact with the respective adjacent structure to accomplish the intended sealing function. The diameters of circular recess 52 and annular inner wedge portion 40 are chosen so that converging walls 74 and 76 contact diverging walls 54 and 56 about simultaneously as wedge portion 40 is urged by helical compression spring 42 into circular recess 52. The included angles between inner converging wall 74 and the longitudinal axis of rod 14 is, however, greater than the included angle between the longitudinal axis of rod 14 and outer converging wall 76, as shown, for example, in FIG. 2. The converging wall 74 thus exerts a greater radial load on sealing lip 60 than is exerted by converging wall 76 on sealing lip 64. Also, outer converging wall 76 changes from a frusto-conical to a cylindrical surface at about the same axial location at which annular groove 46 ends. The outermost edge 62 of sealing lip 60 is forced more strongly against the surface of rod 14 than the outermost edge 66 of outer sealing lip 64 is forced against the wall of cylinder 12. Thus, there is greater radial load applied to outermost edge 62 where dynamic sealing is required than is applied to outermost edge 66 where the seal is static. Because of the differences in the included angles and the cylindrical portion of outer converging wall 76, the outwardly directed radial load is not only smaller than the inwardly directed radial load, but it also increases progressively less as the wedge portion of the seal actuator continues inwardly into the U-shaped recess in the elastomeric seal.

Annular groove 46 is positioned at the base of cylindrical guide portion 38 so as to receive the end of helical compression spring 42. Annular groove 46 is concentric with the longitudinal axis of rod 14. Annular groove 46, annular nose 68, and circular recess 52 all have about the same diameters so that the force exerted by helical compression spring 42 is exerted along an imaginary cylinder which includes annular groove 46, the tip of annular nose 68, and the bottom of circular recess 52. In order to relieve fluid pressure within the seal assembly perforations are provided in spring retainer 44 and annular nose 68 so that fluid pressures which might interfere with the operation of seal assembly 20 are relieved.

Rod bearing 28 supports the base of seal 24 and prevents rod 14 from deflecting laterally out of its intended axial position in cylinder 12. The diameter of rod bearing 28 is several thousandths of an inch greater than the diameter of rod 14 so that rod bearing 28 does not normally contact the surface of rod 14. This enlarged diameter prevents rod bearing 28 from wiping the surface of rod 14. Thus, any fluid which does escape the wiping action of outermost edge 62 will be retained on the surface of rod 14 and will be carried back to the fluid side of seal 24 on the next cycle of snubber 10. Rod bearing 28 does, however, prevent rod 14 from deflecting laterally far enough to damage or impair the function of seal assembly 20.

The seal assembly described herein is well suited to applications other than in snubber devices. The integral construction of the cylindrical guide portion 38 and annular integral wedge portion 40 provides a simple, reliable structure which is at once effective, self-renewing, simple, and lightweight. As the outermost edges 62 and 66 become worn or creep due to cold flow, the action of spring 42 forces integral wedge portion 40 deeper into circular recess 52, thus maintaining the necessary radial loads on sealing lips 60 and 64. Previous expedients which have attempted to compensate for wear in seals have involved complicated structures in which the wedging elements are not integral. Such prior expedients are illustrated, for example, in Granberg et al. U.S. Pat. No. 2,827,314 and Fruehauf U.S. Pat. No. 3,520,542. Prior expedients, such as suggested by Stewart U.S. Pat. No. 2,807,484, did not appreciate the significance of maintaining the wedging element in proper alignment with the sealing elements so that the resultant radial loads are distributed uniformly around their circumferences.

If desired, the seal assembly of this invention may be affixed to the rod so that the seal between the rod and the inner lip is stationary, and the seal between the outer lip and the inner wall of the cylinder is dynamic. Under these circumstances the annular integral wedge portion would be proportioned so that the radial load applied to the dynamic side of the seal is greater than the radial load applied to the static side of the seal.

What has been described are preferred embodiments in which modifications and changes may be made without departing from the spirit and scope of the accompanying claims.

What is claimed is:

1. In a seal assembly the elements comprising:
an annular elastomeric seal element having an outer annular side adapted to be received in sealing relationship within a seal receiving bore, a central axial bore generally concentric with said outer annular side and adapted to receive a cylindrical rod in sealing sliding relationship, a first end, a second end, and a circular recess in said second end extending generally concentrically with said axial bore and opening axially of said seal element to define an inner sealing lip adapted to seal with said cylindrical rod and an outer sealing lip adapted to seal with said seal receiving bore; and
a seal actuator element including guide means for aligning said actuator element with said seal element, and integral annular wedge means cooperating with said circular recess for applying radial loads to said inner and outer sealing lips to force said lips into sealing relationship with said cylindrical rod and seal receiving bore, respectively, said circular recess and wedge means being proportioned so that the load applied to said inner sealing lip is greater than the radial load applied to said outer sealing lip, the walls of said circular recess defining generally frusto-conical surfaces which diverge outwardly toward said integral annular wedge means and the walls of said wedge means defining generally frusto-conical surfaces which converge inwardly toward said circular recess, said walls being proportioned so that the walls of said wedge means converge more rapidly than the walls of said circular recess diverge, the radially inner wall of said wedge means converging more rapidly relative to the radially inner wall of said circular recess than the radially outer wall of said wedge means converges relative to the radially outer wall of said circular recess whereby the radial load applied to said inner sealing lip is greater than the radial load applied to said outer sealing lip.

2. In a seal assembly the elements comprising:
an annular elastomeric seal element having an outer annular side adapted to be received in sealing relationship within a seal receiving bore, a central axial bore generally concentric with said outer annular side and adapted to receive a cylindrical rod in sealing sliding relationship, a first end, a second end, and a circular recess in said second end extending generally concentrically with said axial bore and opening axially of said seal element to define an inner sealing lip adapted to seal with said cylindrical rod and an outer sealing lip adapted to seal with said seal receiving bore; and
a seal actuator element including guide means for aligning said actuator element with said seal element, and integral annular wedge means cooperating with said circular recess for applying radial loads to said inner and outer sealing lips to force said lips into sealing relationship with said cylindrical rod and seal receiving bore, respectively, said circular recess and wedge means being proportioned so that the load applied to said inner sealing lip is greater than the radial load applied to said outer sealing lip, the walls of said circular recess defining generally frusto-conical surfaces which diverge outwardly toward said integral annular wedge means at a first included angle and the walls of said wedge means defining generally frusto-conical surfaces which converge inwardly toward said circular recess at a second included angle, said second included angle being greater than said first included angle, and the included angle between the longitudinal axis of said cylindrical rod and the radially inner wall of said wedge means being greater than the included angle between said longitudinal axis and the radially outer wall of said wedge means.

3. In a seal assembly the elements comprising:
annular elastomeric seal means for dynamically and statically sealing a cylinder which has a cylindrical rod slidably received therein, said seal means including radially inner and outer sealing lips arranged in a generally U-shaped cross-sectional configuration; and seal actuator means for applying and maintaining a first radial load uniformly in all radial directions outwardly to said radially outer sealing lip and a second radial load uniformly in all radial directions inwardly to said radially inner sealing lip, said second radial load being greater than said first radial load, said means for applying and maintaining including an integral annular wedge means for contacting both said radially inner and radially outer sealing lips to exert said first and second radial loads on said respective sealing lips, said integral annular wedge means including a guide portion having an axial cylindrical bore into which said cylindrical rod is received in a snug sliding relationship with said cylindrical rod, said integral annular wedge means being proportional so that said first and second radial loads increase as said integral annular wedge means moves axially toward said annular elastomeric seal, said first radial load increasing progressively less as said integral annular wedge means continues to move axially toward said annular elastomeric seal.

4. A snubber comprising:

a cylinder having an inner bore and adapted to contain a fluid;

a cylindrical rod axially and slidably received in said cylinder, said rod having an outer cylindrical surface and means for acting on said fluid to dampen the relative axial movement between said cylinder and said rod;

an annular elastomeric seal means positionable in said inner bore for dynamically and statically sealing said cylinder to retain said fluid within said cylinder, said seal means including radially inner and outer sealing lips arranged in a generally U-shaped cross-sectional configuration;

seal actuator means for actuating said seal means including an integral annular wedge means for contacting both said inner and outer sealing lips to apply a first radial load uniformly in all radial directions within a single plane outwardly to said radially outer sealing lip and a second radial load which is greater than said first radial load uniformly in all radial directions within a single plane inwardly to said radially inner sealing lip, said wedge means including means for applying the greatest radial loads at about the outermost edges of the said respective sealing lips, said integral annular wedge means including a guide portion having an inner cylindrical bore into which said cylindrical rod is received in a snug sliding fit to maintain said seal actuator means in concentric relationship with said cylindrical rod, the walls of said generally U-shaped cross-sectional configuration defining generally frusto-conical surfaces which diverge outwardly toward said integral annular wedge means at a first included angle and the walls of said wedge means define generally frusto-conical surfaces which converge inwardly toward the open side of said generally U-shaped cross-sectional configuration at a second included angle, said second included angle being greater than said first included angle, and the included angle between the longitudinal axis of said cylindrical rod and the radially inner wall of said wedge means being greater than the included angle between said longitudinal axis and the radially outer wall of said wedge means; and means for retaining said seal means and seal actuator means in said inner bore in sealing relationship with said cylinder and said cylindrical rod.

* * * * *